May 13, 1969     M. D. WIJNEN ET AL     3,444,002

PRIMARY CELL WITH PERSULFATE DEPOLARIZER

Filed June 14, 1966

INVENTORS
MARINUS D. WIJNEN
PIETER A. BOTER
BY

AGENT 3,444,002
PRIMARY CELL WITH PERSULFATE DEPOLARIZER
Marinus Dirk Wijnen and Pieter Abraham Boter, Emmasingel, Eindhoven, Netherlands, assignors, by mesne assignments, to U.S. Philips Corporation, New York, N.Y., a corporation of Delaware
Filed June 14, 1966, Ser. No. 557,489
Claims priority, application Netherlands, June 24, 1965, 6508091
Int. Cl. H01m 21/10, 15/04
U.S. Cl. 136—112                                9 Claims

ABSTRACT OF THE DISCLOSURE

A primary cell which employs a storable flexible foil which can be placed between a pair of metal plates constituting the electrodes and which can be activated by being moistened or by the addition of an aqueous liquid. The foil includes a depolarizer consisting of a porous carrier layer of insulating material, e.g., paper, the pores of which are filled with a mixture of potassium, sodium, or ammonium persulfate and a catalyst, e.g., carbon.

---

Figure 1:
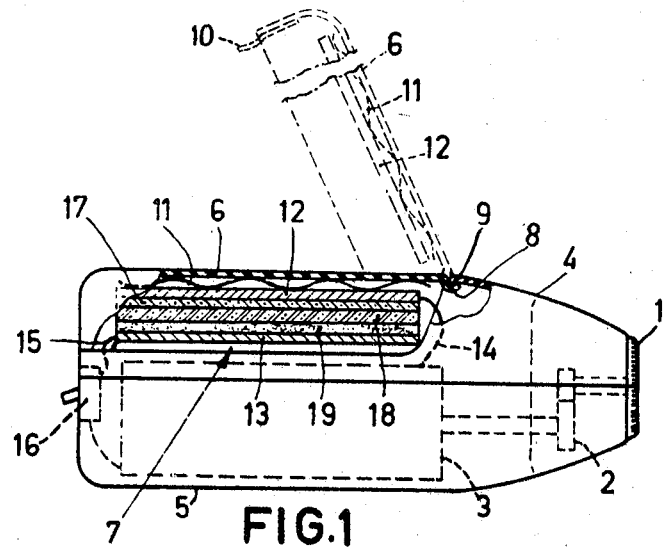

This invention relates to a primary cell which can be activated by the addition of an aqueous liquid, and a foil material suitable for use therein.

A principal object of the invention is to provide a primary cell capable of supplying for a short period of time a power output which is large in relation to the volume of the cell.

A further object of the invention is to provide a primary cell in which the current supply member is easily replaceable.

A still further object of the invention is to provide a primary cell in which the current supply member is in the form of a foil which is readily replaced.

These and further objects of the invention will appear as the specification progresses.

A primary cell according to the inventoin, comprises a releasable clamping device in which are arranged at least one pair of opposing plates pushed towards each other and consisting, at least in part, of a metal and a depolarizer layer therebetween. This depolarizer layer consists substantially of a mixture of a finely-divided persulfate selected from the group consisting of potassium, ammonium, and sodium persulfates, and mixtures thereof. The depolarizer together with finely-divided carbon and a liquid absorbing separator layer is in the form of an exchangeable foil, having substantially the same dimensions as the plates and is pressed between the plates. The depolarizer layer and one plate, which is an inert electrode is separated by a liquid-tight layer of finely-divided carbon and a binder. The depolarizer layer then forms the electron conducting connection between both plates. The separator layer on the side remote from the depolarizer layer is in planar contact with an electrode of an electronegative material metal and may be formed by the other plate of the clamping device. When current is supplied by a cell, metal of this electrode is dissolved so that the plate must be replaced in time, or at least the corroded surface thereof, must be made smooth again. Another feature of the invention is that the electrode of electronegative metal, instead of being constructed by one of the pair of plates, is constituted by a separate foil of an electronegative metal, which is in planar contact with the adjoining plate.

The depolarizer layer preferably contains substantially equal amounts by weight of persulfate and carbon. It is also advantageous if the depolarizer layer, which will always have to be replaced by a new layer after use, is a foil of fibrous material which contains the mixture of persulfate and carbon. The depolarizer layer may also be a foil obtained by compressing a dry-mixture consisting of finely-divided persulfate having a grain size of approximately from $20\mu$ to $30\mu$, carbon having approximately the same maximum grain size, and an inert synthetic material as a binder.

The use of a depolarizer layer consisting substantially of finely-divided persulfate and finely-divided carbon, permits the cell to supply an amount of energy (watts per cubic cm. or watts per gram) which is high in proportion to its volume and weight. This energy is approximately proportional to the surface area of the depolarizer layer which is in contact with the inert electrode through the electron-conducting liquid-tight layer.

Although the period of life of the cell once activated is considerably shorter, due to the solubility of the persulfate than that of conventional galvanic cells having pyrolusite ($MnO_2$) as a depolarizer, its electrical power is many times greater. For many modern uses it is of primary importance to have an assured supply of comparatively large, although limited power rather than a limited supply of current over a longer period. For example, a source of large dependable current is often required in military installations, in the construction of toy models, and for emergency light sources, such as alarm lights in case of accidents on the road.

A further advantage in the use of persulfate in the depolarizer layer is its non-toxicity. Consequently, it is unnecessary to take precautions in the construction and use of a primary cell employing such a depolarizer.

In a preferred embodiment of a primary cell according to the invention the clamping device comprising the plates forms a structural unit with the electrical consumer to be energized by the cell. To this end the cell is included together with the plates in a permanently available electrical circuit. In other words the primary cell and the consumer advantageously may be arranged in the same housing, e.g., the cell may be incorporated in the consumer. Examples of consumers employing a primary cell according to the invention are electrical shaving apparatus, emergency lights, electrical tooth brushes, table fans, portable miniature radio and television sets, miniature particle vacuum cleaners, and the like.

Figure 2:
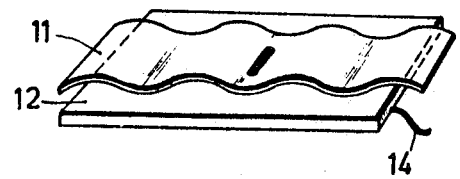
Figure 2:
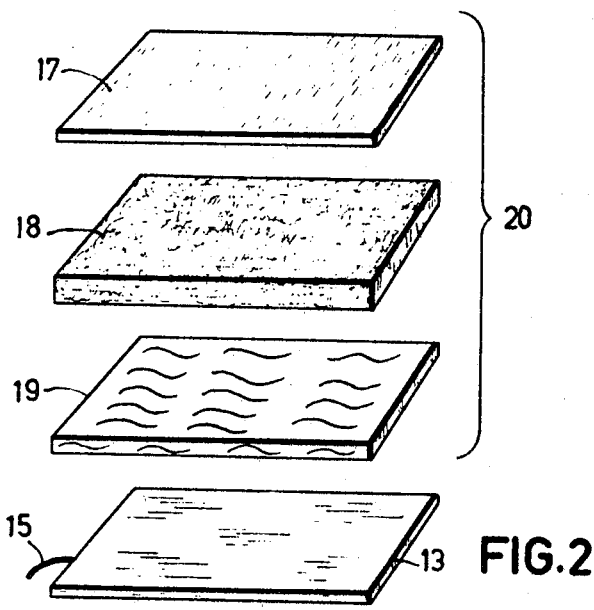

The invention will now be described with reference to the accompanying drawing in which FIG. 1 is a side view of an electrical shaving apparatus in which a part of the side wall of a detachable cover has been removed in order to show the primary cell;

FIG. 2 is an exploded view of a primary cell according to the invention.

The electrical shaver shown in side view in FIG. 1 is of the type having two rotary shaving heads 1 located side by side in a direction at right angles to the plane of the drawing. The shaving heads are driven through a transmission mechanism 2 (shown diagrammatically) by means of a small electric motor 3. The housing of the apparatus consisting of synthetic resin material comprises an upper part 4 and a lower part 5, the former having a detachable cover 6, which when closed embraces a space containing an activatable galvanic element 7. On its side adjacent the shaving heads 1, the cover 6 has a part 8 forming a groove which is engaged by a bent-edge 9 of the part 4. The cover 6 and the part 4 are thus pivotally connected together so that the cover may be moved into the position shown in broken lines in FIG. 1, in order to make the activatable primary cell 7 accessible. In the closed position of the cover 6, its left-hand end is held in position by a resilient clasp 10 secured to the cover engaging around a ledge (not shown) formed on the inner side of the left-hand side wall of the part 4. An undulated resilient element 11 (FIG. 2) is secured to the inner side of the cover 6, for example due to the ends thereof being placed under inwardly directed projections of the cover (not shown). A thin metal plate 12 of, for example approximately 4 x 4 cm. and a thickness of approximately 1 mm. is secured to the center of the resilient element 11 which may be made of metal or a synthetic resin material. This plate, which constitutes the negative electrode of the activatable primary cell 7, is made of electronegative metal, for example, magnesium, zinc, aluminum or alloys thereof. On the other side of the cell 7 there is a thin metal plate 13 having dimensions equal to those of the plate 12. The thin plate 13 is secured to a fixed portion of the part 4 of the housing of the apparatus and constitutes an inert electrode for the cell. The plate 13 may be of carbon, aluminum, copper or any other metal. To prevent any chemical attack of the surface of the metal plate 13, it may be covered with, for example, a thin layer of gold or platinum approximately 60μ thick. This is not necessary if the plate 13 consists of aluminum. Alternatively the plate 13 may be a nickel-plated steel plate. Negative electrode 12 is connected through a current conductor 14 to one terminal of the electric motor 3 and the inert electrode 13 is connected through a current conductor 15 to another terminal of the electric motor 3 through a switch 16 incorporated in the part 5 of the housing.

In the closed position of the cover 6, three parts 17, 18 and 19 in the form of foils are maintained pressed against one another between the plates 12 and 13 due to the resilience of the element 13. The foils 17, 18, and 19 constitute replaceable parts of the activatable element, which may be replaced by new ones after the cell has been depleted.

The foil 17 is a porous liquid-absorbing separator foil having a thickness of at least .002 mm., for example 0.2 mm., and preferably consist of absorbent paper. The foil 18 constitutes a depolarizer layer consisting substantially of a mixture of finely-divided persulfate selected from the group consisting of potassium, ammonium and sodium persulfates and mixtures thereof, and finely-divided carbon such as graphite and/or soot. The depolarizer layer 18 preferably contains approximately equal amounts by weight of persulfate and carbon. The mixture of persulfate and carbon may be included in a porous, inert carrier for the formation of the layer 18. Such a carrier preferably consists of fibrous material, i.e., paper fibers. Consequently, a suitable method of manufacturing foil material, from which the depolarizer layer 18 may be cut, consists in adding the persulfates in a finely-divided state and finely-divided carbon to a paper pulp and dipping the resulting mixture in the manner customary in the manufacture of paper. Alternatively the depolarizer layer may be obtained by compressing a mixture consisting of finely-divided persulfate, having a grain size of approximately from 20μ to 30μ, and finely-divided carbon, which mixture may also contain, if desired, a thermoplastic binder, such as powdered polydene having a grain size of approximately 400μ.

The above-mentioned weight ratio of the persulfate and the carbon in the depolarizer layer 18 of approximately 1:1 is advantageous. A smaller proportion of carbon if the total weight is the same, provides a greater energy content per cc., but the output, that is to say the specific power (watts per cc. of depolarizer mass) to be supplied by the cell after activation is then lower. A larger proportion of carbon does not increase the output to any appreciable extent and decreases the energy content.

Foil 19 is a liquid-tight electrically conductive foil, which must provide for the electron conduction between the depolarizer layer 18 and the inert electrode 13 and which must also keep the plate 13 free from the electrolyte to be absorbed by separator foil 17 and depolarizer layer 18 upon the activation of the cell. Foil 19 largely consists of carbon, and is obtained by first rolling a mixture of finely-divided graphite and/or soot and a thermoplastic binder, such as polyethylene, in a weight ratio of 1 part of graphite and/or soot and 1.3 parts of polyethylene. The mixture which has been rolled into the form of a sheet is then heated at approximately 150° C. for approximately 1 minute. Foil 19 preferably has a thickness of approximately 0.2 mm.

For activating cell 7, after the cover 6 has been opened an amount of an aqueous liquid, sufficient for completely wetting the foils 17 and 18 is poured onto the exposed separator foil 17. This aqueous liquid may contain a suitable soluble salt, for example, NaCl in a concentration of approximately 25% by weight. However, it is also possible to provide the salt in crystalline form in cell 7 itself, for example in separator foil 17, or even in depolarizer layer 18, in which case the aqueous liquid may simply be water. The pouring of the aqueous liquid onto the separator foil 17 is facilitated if the liquid, which, as mentioned above, may be a salt solution, has been thickened with a thickening agent, for example, by adding 1% of agar. The proportioning of the amount of liquid thus becomes easier.

It has been found that after a closure of the cover, due to the pressure then exerted on the underlying foil packet 20 (see FIG. 2) by the plate 12, the water or the electrolyte has sufficiently penetrated through the separator foil 17 and depolarizer layer 18. Next the shaving apparatus can be put into operation, by means of switch 16. If the energy consumed by electric motor 3 is approximately 1 watt, and when using a depolarizer layer of 4 x 4 cm. and 1 mm. thickness, it has been found possible to shave oneself for a period of certainly from 6 to 7 minutes. Consequently, the output of the cell 7 has been found to be approximately 0.84 ampere hour.

It will be evident that, after use of the apparatus following the activation of the cell 7, the consumed depolarizer layer 18 and separator foil 17, and if necessary electron-conducting foil 19 may readily be replaced by new ones, and for this purpose the cover 6 only need be opened. If, therefore, a small supply of foil material for the layers 17, 18, and 19 is available, which in the dry stage has a substantially unlimited life, the illustrated shaving apparatus with a cell incorporated therein is ready for use at any time by placing new foils in the cell 7 and then activating this cell with liquid at the instant the apparatus is used. The foils 17, 18, and 19 need not be loosely assembled but may be held together along the edges, for example, by means of an adhesive. This facilitates keeping foil material in stock for renewing the cell 7.

During the supply of current from the cell 7 to the consumer that is electric motor 3, material of negative electrode 12 is dissolved. This implies chemical attack of that side of the plate 12 which is adjacent separator layer 17 so that in certain cases it is desirable that this side of the plate may be cleaned again after the element is renewed after each use. This need not in itself be objectionable but may be obviated by separating separator layer 17 and plate 12 by a thin foil of electronegative metal which undertakes the function of a negative electrode, the plate 12 then fulfilling the function of a collector. This metal foil may either be a loose foil or be provided, for example, by evaporation, as a metal layer approximately 60μ thick on the side of the separator layer 17 which is remote from the plate 12.

In view of the period of life of the activated cell 7 it would be advantageous if the persulfate used in the depolarizer layer 18 were potassium persulfate since its solubility is less than that of the other persulfates specified. If potassium persulfate is used NaCl is sufficient to make the electrolyte 7 conductive. From an economic viewpoint, however, it is more advantageous to use the less expensive ammonium persulfate in depolarizer foil 18. Undue dissolution of the persulfate is in this case inhibited by not using, or not exclusively using, NaCl as the salt for imparting the desired conductivity to the electrolyte, but including an amount of soluble potassium salt, for example, KCl, in the element itself and/or the aqueous liquid to be used for the activation thereof. The amount of potassium salt used is preferably chosen to be such that the amount of potassium is more or less equivalent to the amount of ammonium in depolarizer layer 18.

The invention has been explained with reference to an electrical consumer in the form of an electrical shaving apparatus, having incorporated therein an activatable current source. It will be evident that such an activatable current source also may comprise a plurality of cells. Furthermore such a current source may or may not be incorporated in the electrical consumer. However, a principal advantage is the rapidity with which the cell can be activated. An example requiring a cell activatable on instant notice is warning lights for emergency cases which must be capable of being put into operation instantly.

The cell according to the invention is also suitable for emergency use to energize an electric starting motor for an internal combustion engine used in automobiles if the rechargeable lead battery normally used for that purpose is discharged. The activatable current supply device then should comprise a plurality of series connected cells each of which comprises a depolarizer layer and a separator layer sandwiched between electrodes such that the voltage delivered by that series connection is capable of supplying the desired voltage to the starting motor. The electrodes may be constituted by plates consisting of zinc, which at the side facing a depolarizer layer have provided thereon an inert coating consisting of for example finely-divided carbon and a binder material. Each of said plates may then simultaneuosly function as a positive electrode for one cell and as a negative electrode for the next following cell. In order to reactivate the current supply device according to the invention all that is required is a small supply of foil material which occupies only a small space and can readily be inspected. The life of this foil material, if stored in the dry state, is practically unlimited.

Therefore while the invention has been described in connection with specific embodiments and applications thereof, other modifications will be apparent to those skilled in this art without departing from the spirit and scope of the invention which is defined in the appended claims.

What is claimed is:

1. A primary cell activatable by adding an aqueous liquid comprising a pair of spaced opposed metal plates one of which includes an electronegative metal portion constituting one electrode and the other plate constituting an inert electrode, a layer of a depolarizer material disposed between said plates, said depolarizer layer consisting of a finely-divided persulfate selected from the group consisting of potassium persulfate, ammonium persulfate, sodium persulfate, and mixtures thereof and finely-divided carbon, said depolarizer layer having substantially the same dimensions as those of the plates and being in the form of a replaceable foil, a liquid-tight layer of finely-divided carbon and a binder separating the depolarizer layer and the plate constituting the inert electrode, said liquid-tight layer constituting an electron-conducting connection between the electrodes of the cell, a layer of liquid absorbent material positioned between the depolarizer and the electrode of the electronegative metal, and means to releasably clamp said electrodes and compress said depolarizer layer and said separator layers between said electrodes.

2. A primary cell as claimed in claim 1, in which the electrode of electronegative metal is a metal foil which engages the metal plate.

3. A primary cell as claimed in claim 1, in which the depolarizer layer contains substantially equal amounts by weight of persulfate and carbon.

4. A current supply device as claimed in claim 1, in which the depolarizer layer is formed by a foil of fibrous material in which the mixture of persulfate and carbon is incorporated.

5. A current supply device as claimed in claim 1, in which the depolarizer layer is a compressed dry mixture consisting of finely-divided persulfate having a grain size of approximately from $20\mu$ to $30\mu$, carbon having approximately the same maximum grain size and an inert synthetic resin material as a binder.

6. A current supply device as claimed in claim 1, in which the liquid-tight electron-conducting layer consists of a mixture of finely-divided carbon and a thermoplastic synthetic resin material.

7. A current supply device as claimed in claim 1, in which the persulfate in the depolarizer layer is ammonium persulfate and a potassium salt is provided for activating the cell, the amount of potassium being approximately equivalent to the amount of ammonium in the depolarizer layer.

8. A current supply device as claimed in claim 1, in which the pair of plates is supported by one of two parts of an apparatus connected together by a hinge.

9. A current supply device as claimed in claim 8, in which the clamping device with its plates forms a structural unit with an electrical consumer energized by the cell which is included together with the plates in an electric circuit with the consumer.

References Cited

UNITED STATES PATENTS

| | | | |
|---|---|---|---|
| 1,147,753 | 7/1915 | Schatzel | 136—137 XR |
| 1,771,190 | 7/1930 | Polcich | 136—137 |
| 2,496,709 | 2/1950 | Gelardin | 136—111 |
| 2,626,295 | 1/1953 | MacFarland | 136—111 |
| 2,880,259 | 3/1959 | Nowotny | 136—111 |

ALLEN B. CURTIS, *Primary Examiner.*

A. SKAPARS, *Assistant Examiner.*

U.S. Cl. X.R.

30—45; 136—137, 155